(12) United States Patent
Chiasson

(10) Patent No.: US 11,700,861 B2
(45) Date of Patent: Jul. 18, 2023

(54) CRAB PROCESSING MACHINE AND METHOD, AND CRAB EVISCERATING DISC THEREFOR

(71) Applicant: Stéphane Chiasson, Petit-Tracadie (CA)

(72) Inventor: Stéphane Chiasson, Petit-Tracadie (CA)

(*) Notice: Subject to any disclaimer, the term of this patent is extended or adjusted under 35 U.S.C. 154(b) by 34 days.

(21) Appl. No.: 17/300,888

(22) Filed: Dec. 10, 2021

(65) Prior Publication Data

US 2023/0180772 A1    Jun. 15, 2023

(51) Int. Cl.
*A22C 29/00* (2006.01)
*A22C 29/02* (2006.01)
*B08B 3/02* (2006.01)

(52) U.S. Cl.
CPC .......... *A22C 29/025* (2013.01); *A22C 29/005* (2013.01); *A22C 29/023* (2013.01); *B08B 3/022* (2013.01)

(58) Field of Classification Search
CPC ... A22C 29/024; A22C 29/025; A22C 29/027; A22C 29/028; A22C 29/04; A22C 29/005; A22C 29/023
USPC .................................. 452/1; 83/661
See application file for complete search history.

(56) References Cited

U.S. PATENT DOCUMENTS

| | | |
|---|---|---|
| 81,413 A | 8/1868 | Sattler |
| 1,639,976 A | 8/1927 | Barry |
| 2,293,133 A | 8/1942 | Halferty |
| 2,508,784 A | 5/1950 | Cox |
| 3,325,856 A | 6/1967 | Pack et al. |
| 3,495,293 A | 2/1970 | Tolley |
| 3,596,310 A | 8/1971 | Tolley |
| 3,611,478 A | 10/1971 | Lockerby |
| 3,696,465 A * | 10/1972 | Rossnan ............ A22C 29/025 452/8 |
| 3,866,504 A | 2/1975 | Claesson et al. |
| 4,073,041 A | 2/1978 | Davis et al. |
| 4,262,389 A * | 4/1981 | Schwinning ......... A22C 29/028 452/4 |
| 4,293,981 A | 10/1981 | Smith |
| 4,337,552 A | 7/1982 | Iwase |
| 4,380,094 A | 4/1983 | Tolley et al. |
| 4,462,293 A * | 7/1984 | Gunzner ................ E02F 9/285 83/835 |
| 4,479,284 A | 10/1984 | Tolley et al. |

(Continued)

FOREIGN PATENT DOCUMENTS

| | | |
|---|---|---|
| CA | 2995327 | 2/2017 |
| EP | 2965633 | 1/2016 |

(Continued)

*Primary Examiner* — Richard T Price, Jr.
(74) *Attorney, Agent, or Firm* — Mario Theriault

(57) ABSTRACT

A crab eviscerating disc is used in a crab processing machine and a method for processing a crab to a market condition. The disc is used to mill a groove along the underside of a crab body without completely cutting the crab body. Each tooth on that disc has a cut clearance angle of zero degree, and a hook angle of zero degree. Because of these teeth, the depth of the groove is limited by a bony plate and a bony ridge in the crab body. The visceral cavities of the crab body are cleaned by high pressure water sprays oriented in the groove while the crab body is still attached.

9 Claims, 6 Drawing Sheets

(56) References Cited

U.S. PATENT DOCUMENTS

| | | | |
|---|---|---|---|
| 4,503,586 A | | 3/1985 | Lockerby et al. |
| 4,515,055 A | | 5/1985 | Scott |
| 4,535,507 A | * | 8/1985 | Reinke ................. A22C 29/025 |
| | | | 452/1 |
| 4,633,547 A | | 1/1987 | Caroon |
| 4,715,093 A | | 12/1987 | Lapeyre et al. |
| 4,850,407 A | | 7/1989 | Inkster et al. |
| 5,254,031 A | | 10/1993 | Balke |
| 5,401,207 A | | 3/1995 | Hicks et al. |
| 5,580,303 A | | 12/1996 | Winslow et al. |
| D593,584 S | * | 6/2009 | Wilson ......................... D15/133 |
| 8,915,772 B2 | | 12/2014 | Zhou |
| 9,370,834 B2 | * | 6/2016 | Elliston ................ B23D 61/121 |
| 9,375,796 B2 | * | 6/2016 | Elliston ................ B23D 61/121 |
| 10,010,086 B2 | | 7/2018 | Courage et al. |
| D843,802 S | * | 3/2019 | Torres Delgado ........... D15/139 |
| 10,264,799 B2 | | 4/2019 | King et al. |
| 10,485,242 B2 | | 6/2019 | King et al. |
| 2006/0065098 A1 | * | 3/2006 | Cranna ................ B23D 61/121 |
| | | | 83/835 |
| 2007/0169605 A1 | * | 7/2007 | Szymanski ........... B27B 33/144 |
| | | | 83/834 |
| 2017/0355030 A1 | * | 12/2017 | Fowler .................. B23D 61/18 |

FOREIGN PATENT DOCUMENTS

| | | |
|---|---|---|
| KR | 20150051461 | 5/2015 |
| KR | 20180058375 | 6/2018 |
| KR | 101920375 | 11/2018 |
| WO | WO 2016/026930 | 2/2016 |

\* cited by examiner

CRAB PROCESSING MACHINE AND METHOD, AND CRAB EVISCERATING DISC THEREFOR

FIELD OF THE PRESENT INVENTION

The present invention pertains to the field of crab processing machines, and more particularly, it pertains to a crab processing machine comprising an eviscerating disc mounted therein for milling a groove of predetermined width and depth along the longitudinal underside of the crab body.

BACKGROUND OF THE PRESENT INVENTION

Crabs such as Snow Crabs™ and King Crabs™ constitute a delicacy in the seafood market. This product is in high demand and represents an important source of revenues for the fishing industry, especially in the Atlantic seaboard.

A conventional process to prepare a cooked crab for commercial market consists of removing the carapace, cutting the crab body in two halves with the legs attached. Holding the body and legs by hand, exposing the cut surface of the crab body to high pressure water sprays or to a combination of rotating brushes and water sprays, to remove the organs of the crab and to clean the visceral cavities exposed by the cut made.

In present times, the conventional method mentioned above has not changed greatly, except for the fact that several steps of the process are carried out mechanically. Various machines have been developed to cook, to remove the carapace, to eviscerate and clean crabs of inedible material. Two types of machines found in the prior art are described in the following documents, to better explain some of the technological advances known in the industry.

A first type of machines use saws of various thickness to cut the body of the crab in two halves, and take out as much inedible matter as possible with the cut. Then, the body halves are washed with high water pressure and brushes, or high water pressure alone, while the crab body halves are held by the legs.

U.S. Pat. No. 3,495,293 issued to C. B. Tolley on Feb. 17, 1970;
U.S. Pat. No. 3,611,478 issued to W. L. Lockerby on Oct. 12, 1971;
U.S. Pat. No. 3,696,465 issued to M. Rossnan on Oct. 10, 1972;
U.S. Pat. No. 4,293,981 issued to C. M. Smith on Oct. 13, 1981;
U.S. Pat. No. 4,503,586 issued to W. L. Lockerby et al. on Mar. 12, 1985;
U.S. Pat. No. 4,535,507 issued to T. S. Reinke on Aug. 20, 1985;
U.S. Pat. No. 5,401,207 issued to T. S. Hickes et al. on Mar. 28, 1995;
U.S. Pat. No. 5,580,303 issued to C. C. Winslow et al. on Dec. 3, 1996;
U.S. Pat. No. 8,915,772 issued to P. Zhou on Dec. 23, 2014.

During the processing of crabs in these machines, crab bodies are held by the legs of the crabs, wherein the legs are clamped between two conveyor belts, for example. Because crab legs are not rigid, high pressure washing of the visceral cavities of the crab bodies is less than very effective, as the body halves dangle side to side and up and down under the influence of the water sprays.

In some of the machines mentioned above the crab body halves are retained in special fixtures. These fixtures prevent the crab body halves from dangling side to side from the legs and deflect water sprays away from the cavities to be cleaned. The fixtures keep the body halves as steady as possible such that the water impact on the internal cavities of the crab body is as effective as possible.

In the second type of crab processing machines, the carapace is removed, and the crab body is only partially cut. The cut is made by spaced-apart saws for example. The cut is made to varying width and depth. In one example, the cut is only sufficiently deep to cut the belly shell of the animals. In other example, a V-shaped cut is made by a pair of saws to remove the organs of the crab and to expose clean meat. The crab body is then cleaned using high pressure water jets directed into the groove made by the saws.

U.S. Pat. No. 3,596,310 issued to C. B. Tolley on Aug. 3, 1971;
U.S. Pat. No. 4,380,094 issued to C. B. Tolley et al. on Apr. 19, 1983;
U.S. Pat. No. 4,479,284 issued to C. B. Tolley et al. on Oct. 30, 1984;
U.S. Pat. No. 4,535,507 issued to T. S. Reinke on Aug. 20, 1985;
U.S. Pat. No. 4,633,547 issued to L. R. Caroon on Jan. 6, 1987;
U.S. Pat. No. 4,715,093 issued to G. C. Lapeyre et al. on Dec. 29, 1987;
CA Patent 2,995,327 issued to Y. H. Lim on Jan. 9, 2020;
KR Appl. 2015-0051461 publ. by J. J. Lee et al. on May 3, 2015;
KR Patent 10-19203375 issued to K. W. Bae on Nov. 20, 2018.

The method of cleaning crab bodies with high pressure water jets while the crab body halves are still attached is a preferred method, as the cavities to be cleaned are held fixed in a proper orientation relative to the water sprays to allow for an effective cleaning. Predictable cleaning results are possible with this method.

Although predictable results are possible when cleaning crab bodies that have a groove cut along their longitudinal axes, it is believed that still better cleaning results can be obtained by milling a groove of an ideal width and ideal depth.

Therefore, it is believed that there is a market need for a better crab processing machine where crab bodies are properly grooved along their underside to remove the head, mandibles, gills, internal organs, intestines and other inedible material from the visceral cavities. Furthermore, there is a need for milling a groove of consistent dimensions along crab bodies to offer a channel of ideal width and depth to improve the cleaning of all crab bodies without wasting valuable meat.

SUMMARY OF THE PRESENT INVENTION

There is provided herein a crab processing machine wherein an eviscerating disc is used to mill a groove along the longitudinal axis of the crab body, along the underside of the crab body. Water sprays are directed into that groove for efficiently cleaning the visceral cavities of the crab bodies.

In a first aspect of the present invention, there is provided a crab eviscerating disc for milling a groove along the underside of a crab body. This disc has a circular shape and a plurality of teeth extending along a circumference thereof. Each of the teeth are formed by two radial cutting edges extending radially relative to circular shape. The two radial cutting edges being joined by a third cutting edge extending transversely between the two radial cutting edges and defining a tip of the tooth. Each tooth has a cut clearance angle of zero degree.

In another aspect of the present invention, there is provided a crab processing machine for eviscerating and cleaning crabs, comprising in series; an infeed conveyor, a carapace removing and body grooving station, a high pressure water cleaning station and a body separating station.

The carapace removing and body grooving station comprises an eviscerating disc as described above.

In yet another aspect of the present invention, there is provided a method for processing a crab to a market condition, comprising the steps: milling a groove along a longitudinal axis of an underside of crab body, wherein a depth of the groove is limited by a bony plate and a bony ridge in the crab body.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the crab processing machine, and method and eviscerating disc therefor, according to the present invention are described with the aid of the accompanying drawings, in which like numerals denote like parts throughout the several views.

DETAILED DESCRIPTION OF THE PREFERRED EMBODIMENT

The preferred embodiment of the crab processing machine, method and eviscerating disc therefor according to the present invention are described herein below with reference to the attached drawings. The drawings presented herein are presented in a schematic nature, and should not be scaled.

Many components of the preferred machine were not illustrated to facilitate the understanding of the basic concept of the design and method. The components that were not illustrated are those for which the nature, mountings and functions would be obvious to the person skilled in the art of crab processing equipment.

The crab processing machine according to the preferred embodiment is also described in term of its operation and the function of its components. The physical dimensions, material types, and manufacturing tolerances are not provided because these details also do not constitute the essence of the present invention and would be considered obvious to the skilled artisan having acquired the knowledge that is actually provided herein. The machine and method according to the preferred embodiment will be explained herein below, in terms of process steps.

Figure 1:
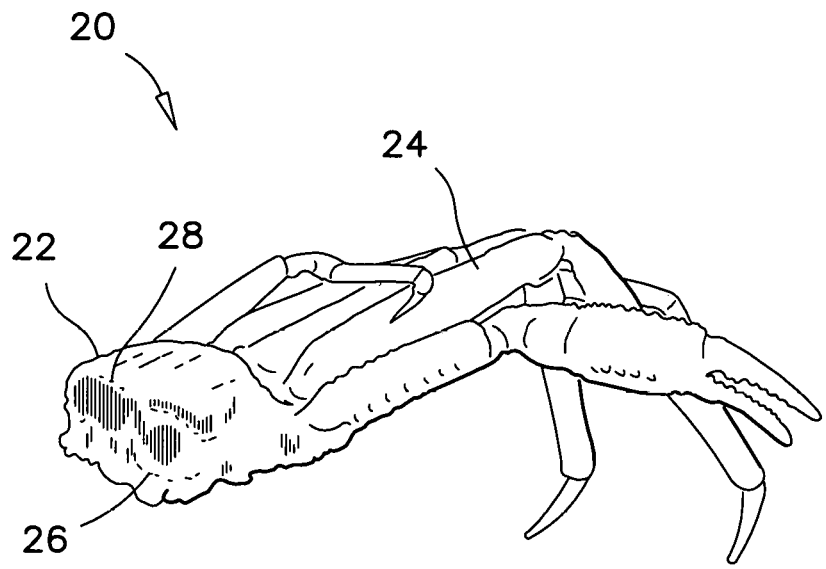
FIG. 1 illustrates a typical crab body half with legs attached, showing a preferred way to present crab meat to customers.

Referring to FIG. 1, a crab product 20 is illustrated. This crab product 20 consists of a crab half with legs attached, ready for market. The carapace has been removed and the visceral cavities has been cleaned out. This crab half 20 comprises crab shoulders 22 and crab legs 24. The crab shoulder portion 22 contains a bony plate 26, sometimes referred to as the thorax plate between and slightly behind the shoulders of the pincer legs of the crab. There is also a bony structure 28 found along the back of the crab. This bony structure 28 is referred to as a bony ridge.

Figure 3:
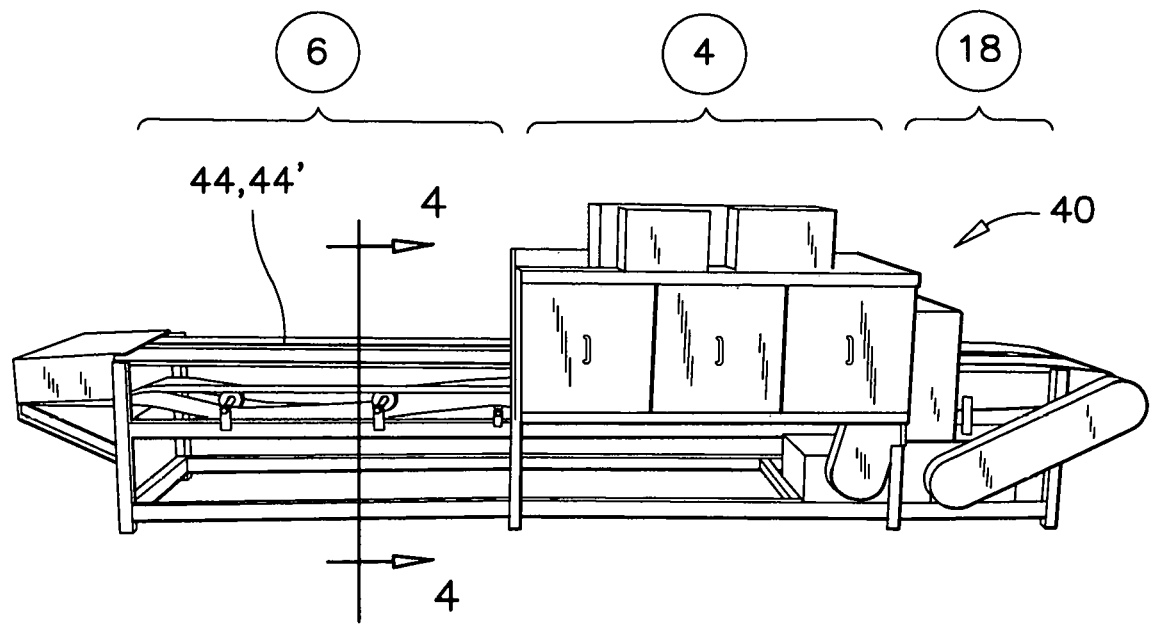
FIG. 3 is a side view of the preferred crab processing machine, identifying the relevant sections of the machine.

Referring now to FIG. 3, the crab processing machine 40 according to the preferred embodiment has an infeed section, labelled as section 6; a processing section labelled as section 4, and an outfeed section labelled as section 18.

Figure 4:
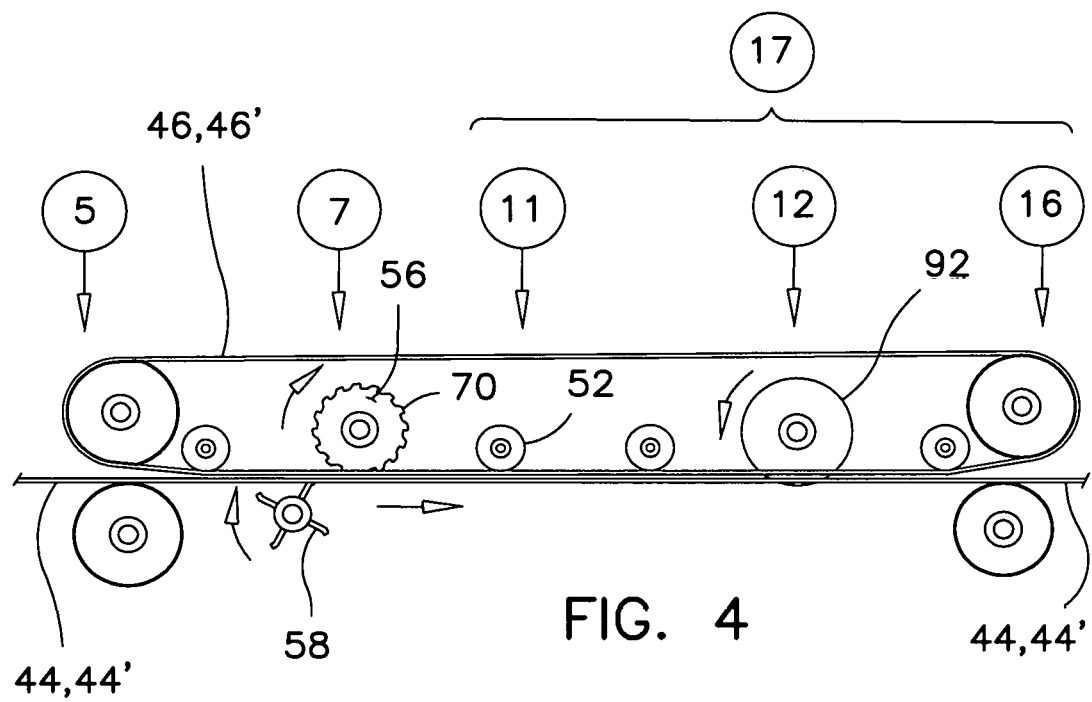
FIG. 4 is a side view of the processing section in the preferred machine as indicated by section 4 in FIG. 3, and identifying the various stations of this section.

The crab processing section, section 4 as illustrated in FIG. 4, comprises a crab leg nipping station 5, a carapace removing and eviscerating station 7, a pressure washing station 11 and a crab body separating station 12 and a crab halves release station 16.

Figure 2:
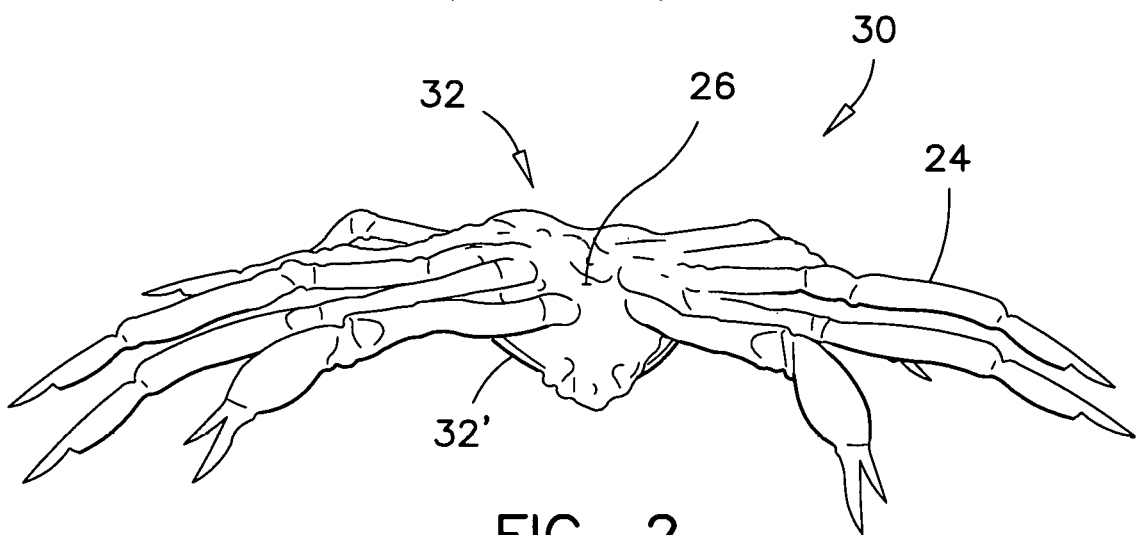
FIG. 2 illustrates a full crab in an upside-down position.
Figure 5:
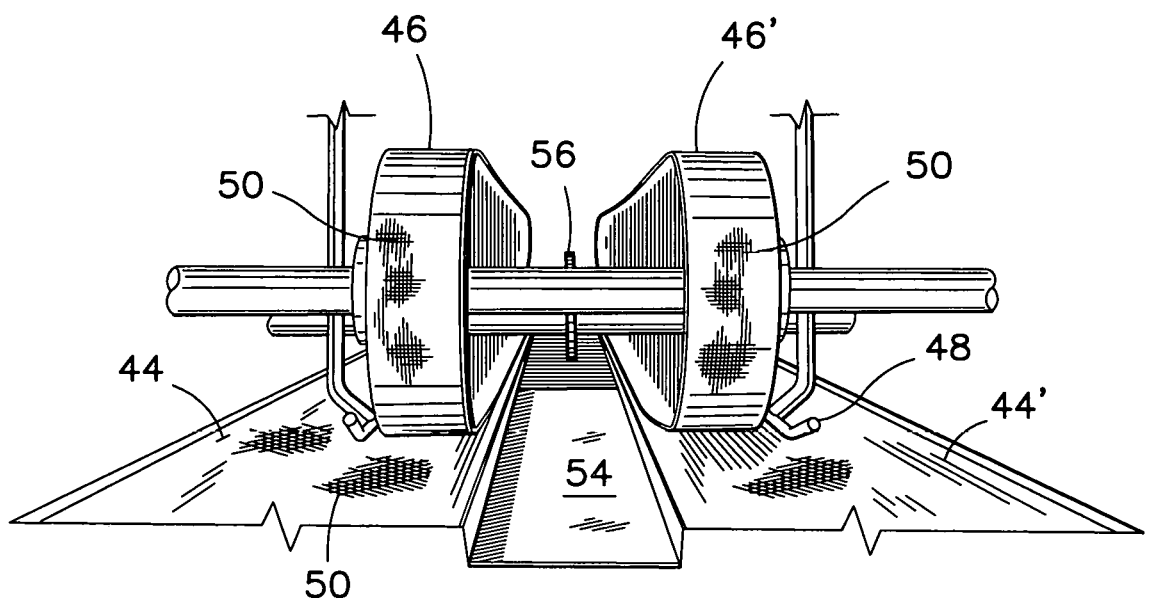
FIG. 5 is an end view of the infeed conveyor in the processing section shown in FIG. 4, as indicated by station 5 in FIG. 4.
Figure 6:
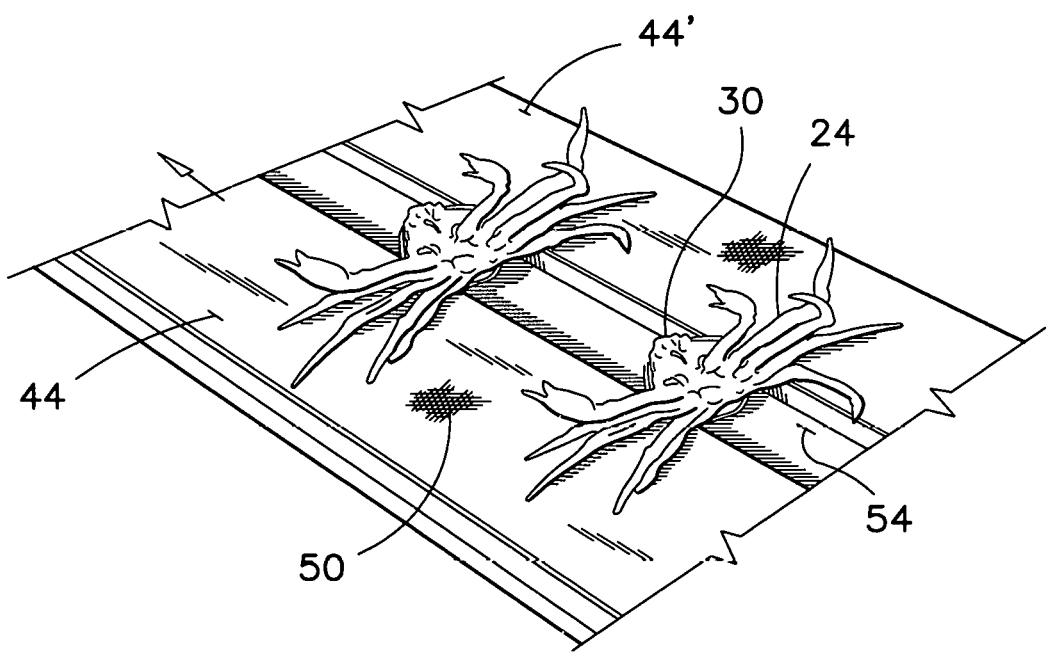
FIG. 6 is a perspective view of the infeed conveyor of the processing section, as indicated by section 6, in FIG. 3, illustrating the proper placement of crabs on the infeed conveyor.

Referring now to FIGS. 3, 4, 5 and 6, the processing of crabs starts by placing cooked crabs 30 on the lower conveyor belts 44, 44' of the infeed section 6. These crabs 30 are positioned on the lower conveyor belts 44, 44', manually by fish-plant workers. These crabs 30 are positioned on the lower conveyor belts 44, 44', carapace down, head forward, with the legs bundled up and extending straight across the conveyor belts 44, 44'. For convenience, a crab 30 with its carapace down and legs 24 bundled up and extending laterally is illustrated in FIG. 2. The proper placement of crabs 30 on the infeed belts. 44, 44' is also illustrated in FIG. 6.

When a crab 30 reaches the leg nipping station 5 of the processing machine 40, as better seen in FIG. 5, the legs 24 of the crab 30 are caught between the lower conveyor belt 44, 44', and a pair of upper belts 46, 46', as can be seen in FIGS. 4 and 5. A pair of guide bars 48 associated with the structure of the upper belts 46, 46' facilitates the engagement of the crab legs 24 between the nipping conveyor belts 44, 44' and 46, 46'. The nipping conveyors belts 44, 44' and 46, 46 have a rough surface 50 that are configured for retaining crab legs there-between with assurance. Furthermore, the upper conveyor belts 46, 46' are pressure-loaded toward the lower conveyor belts 44, 44' by spring-assisted idler wheels 52 for example, as shown in FIG. 4.

The crab 30 that is caught between the lower and upper conveyor belts, 44, 44' and 46, 46' is securely transported to the carapace removing and eviscerating station 7.

Returning back to FIGS. 5 and 6, the crab processing section 4 has a through 54 between the lower conveyor belts 44, 44'. It will be appreciated that the length of this through 54 is interrupted under the carapace removing and eviscerating station 7, to release the carapace in a discard material bin (not shown), for example, under the crab processing section 4.

Figure 7:
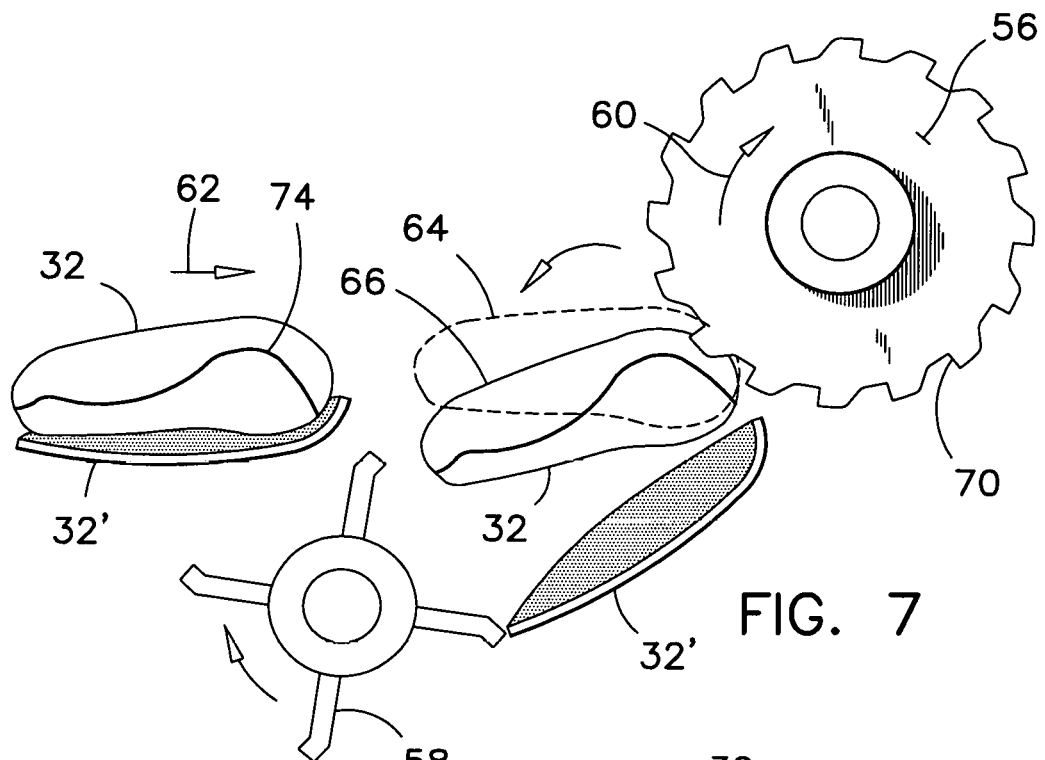
FIG. 7 illustrate a crab being processed at the carapace removal and groove milling station 7 in FIG. 4.

Referring now to FIG. 7, this step of the process associated station 7 will be explained.

Station 7 of the crab processing machine 30 comprises an eviscerating disc 56 also referred to herein as a milling disc, and a flapper wheel 58, ahead and below the eviscerating disc 56. The movement of a crab body 32 along the conveyor belts can be understood in FIG. 7. The milling disc 56 rotates so that its lower segment moves against the movement of the conveyor belts, as can be appreciated by arrow 60 and 62, respectively.

As the milling disc 56 engages with the head of the crab body 32, the disc grinds a groove in the head and the forward end on the carapace 32' of the crab body 32. The initial engagement of the disc 56 with the head of the crab body 32, causes the crab body 32 to tilt against the movement of the conveyor belts, substantially as shown by initial position 64 to tilted position 66. Such tilting causes the carapace 32' of the crab body 32 to engage and to interfere with the rotation of the flapper wheel 58. The attachment of the carapace 32' to the crab body 32 has already been weakened by the eviscerating disc 56. The flapper wheel 58 can therefore easily knock the carapace 32' off the crab body 32, as illustrated in FIG. 7.

The continuing movement of the crab body 32 against the eviscerating disc 56 causes the disc to continue to cut a groove through the crab body 32.

Figure 8:
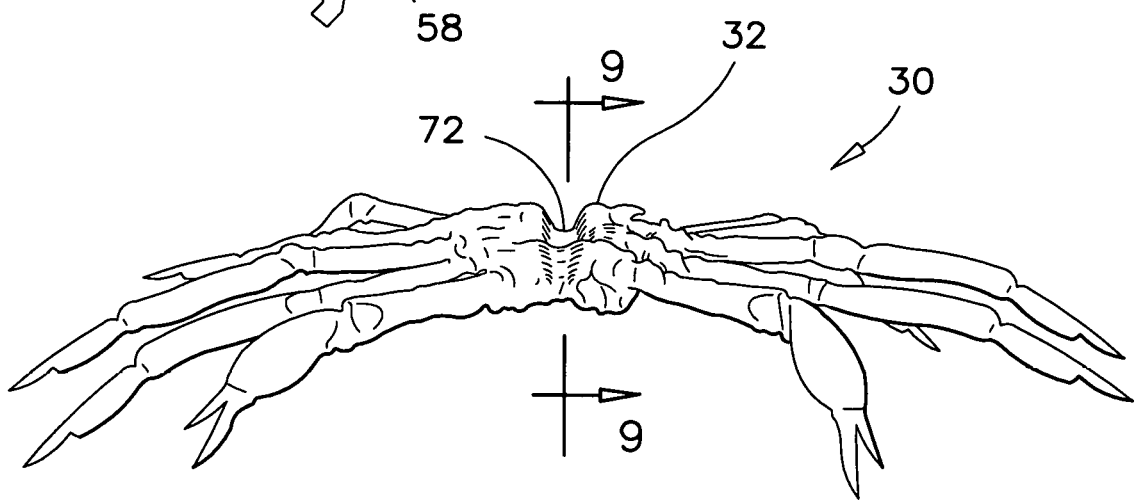
FIG. 8 illustrates a crab leaving the carapace removal and groove milling station 7, showing a typical channel formed along the longitudinal axis of the crab body.
Figure 9:
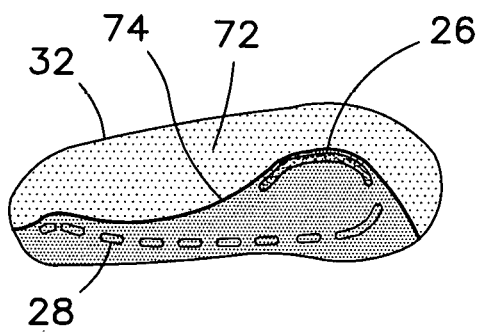
FIG. 9 is a cross-section of the crab body shown in FIG. 8, as viewed along line 9-9 in FIG. 8.

The eviscerating disc 56 has teeth 70 with zero rake angle and zero cut clearance. Because of these teeth 70, the groove 72 formed in the crab body 32 as seen in FIGS. 8, and 9, is somewhat square and has a limited depth. The teeth 70 are bottoming along the groove 72 over the bony plate 26 and the bony ridge 28 mentioned in relation to FIG. 1, and as can be appreciated in the illustration in FIG. 9. The depth of cut by the disc 56 is substantially similar to line 74 in FIGS. 7 and 9.

Figure 10:
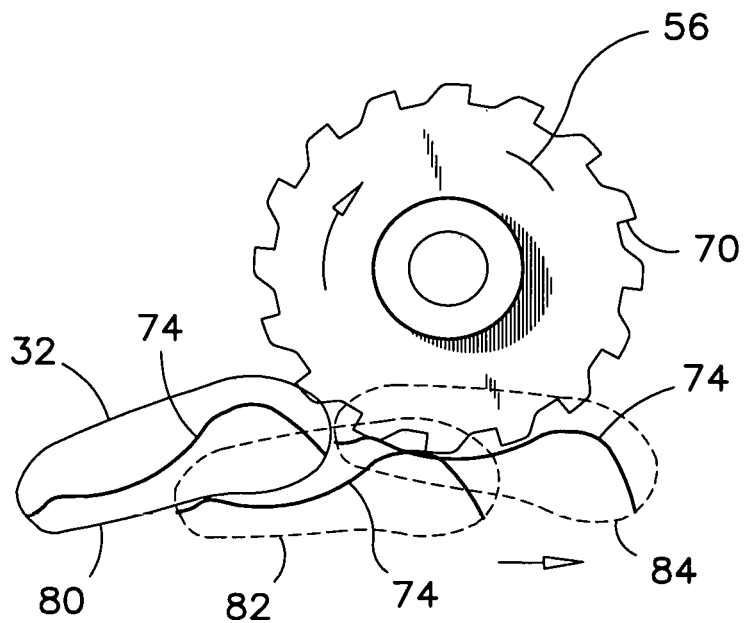
FIG. 10 illustrates the milling of a channel along a crab body, being guided along a typical line of cut.

Because the crab body 32 is held by the attached legs 24 between the conveyor belts, the crab body 32 is free to twist and move away and toward the disc 56, according to the pressure exerted by the milling disc 56 against the crab body 32. Crab legs have a certain degree of elasticity and flexibility. The crab body 32 moves springly toward and away from the disc 56 according to the resistance of the disc 56 to penetrate the crab body 32. The movement of the crab body 32 against the milling action of the disc 56 can be appreciated when looking at FIG. 10 showing the positions of a crab body 32 from an initial contact position 80, to intermediate position 82 and to an exit position 84.

The width and depth of cut of the groove 72 is sufficient to remove the head of the crab, its mandible, its gills, its internal organs, and intestines without wasting considerable edible meat.

Figure 11:
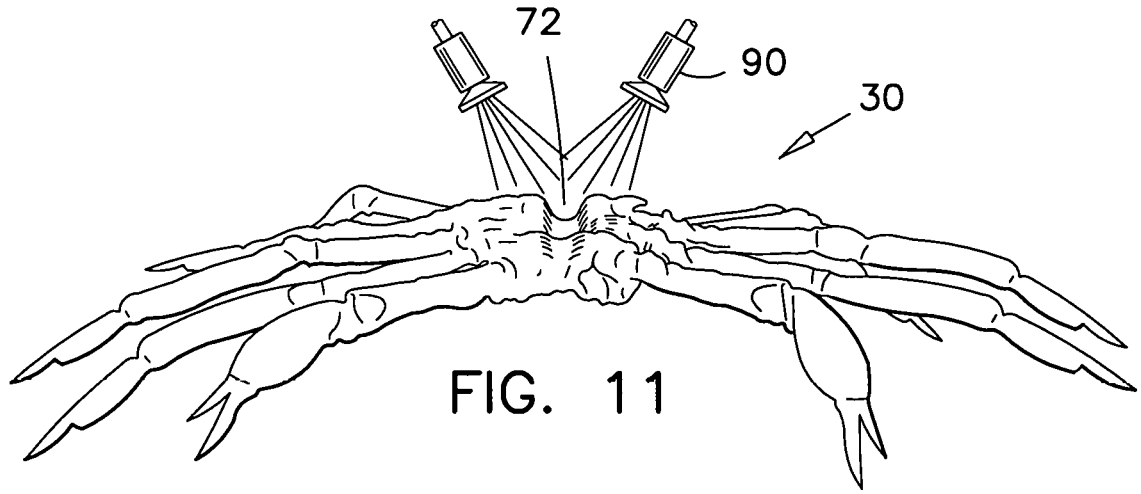
FIG. 11 illustrates a crab being processed at the high pressure washing station 11 in FIG. 4.

Most importantly, the milling disc 56 cleans the visceral cavities of the crab body 32 without separating the crab body 32. The groove or channel 72 made by the eviscerating disc 56 is sufficiently wide to allow high pressure water sprays 90 to reach the entire surfaces of the groove, such as illustrated in FIG. 11, and to remove any remaining loose and undesirable material from the groove 72. The high-pressure water cleaning of the crab body and shoulders takes place from station 11 of the crab processing machine 40.

Figure 12:
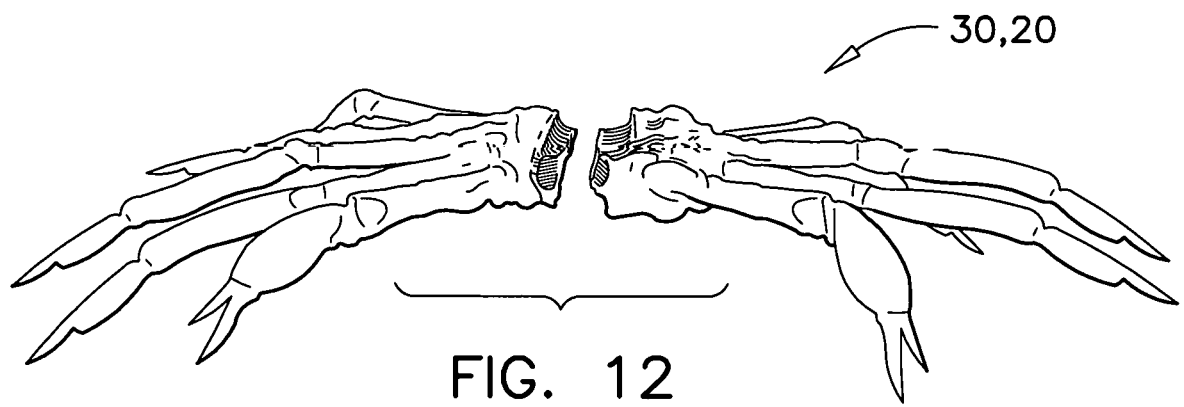
FIG. 12 illustrates a crab leaving the separating station 12 in FIG. 4.

The crab body 32 is then conveyed to station 12 of the crab processing machine 40, where a circular saw 92 separates the crab 30 in two halves 20, as illustrated in FIG. 12.

Although water spray nozzles are present at the carapace removal and body grooving station 7, the final cleaning of the crab halves with legs attached 20 by water sprays, is carried out from station 11, through the cutting station 12 and through to station 16. Station 17 in FIG. 4 illustrates the high water pressure cleaning region of the crab processing section 4. The last cleaning during and after the cutting station 12 is done to remove any inedible material left under the bony plate 26. After this last cleaning, the crab halves 20 are discharged at section 18 of the crab processing machine 40, for a final inspection and delivery to a cold storage facility.

Figure 13:
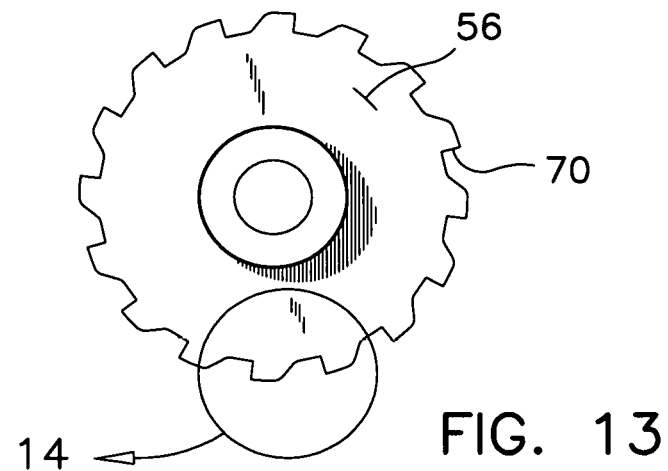
FIG. 13 illustrates a side view of the preferred eviscerating disc mounted in station 7 of the crab processing section 4.
Figure 14:
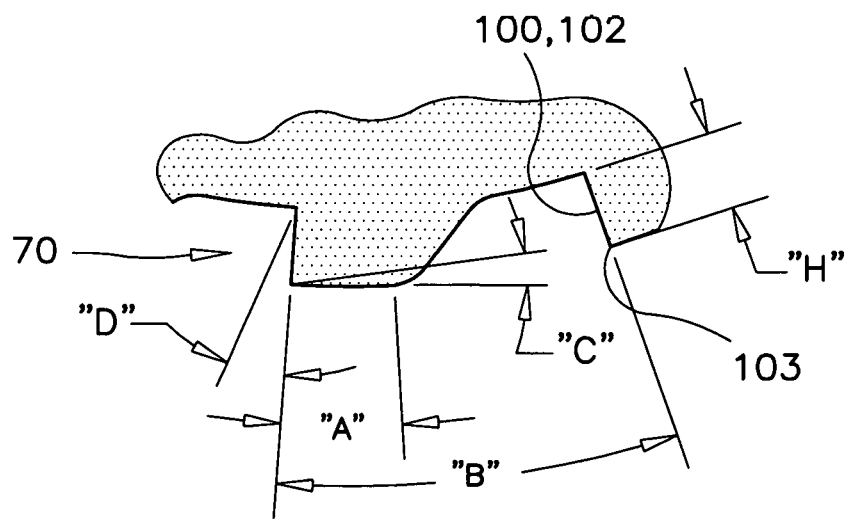
FIG. 14 illustrates various characteristics of the eviscerating disc shown in FIG. 13.
Figure 15:
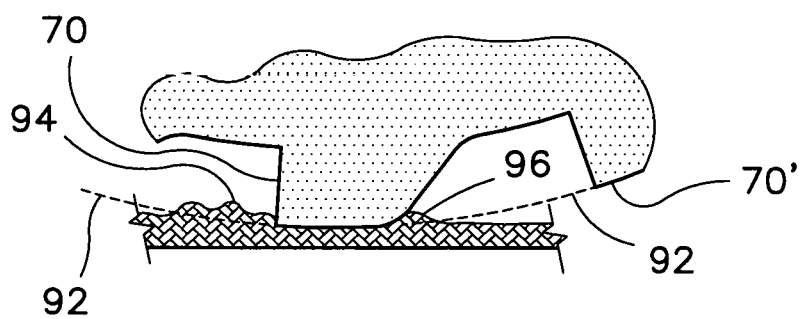
FIG. 15 illustrates the operation of the eviscerating disc on a crab body.

Referring now to FIGS. 13, 14 and 15, the features of the eviscerating disc 56 will be described. The diameter of the eviscerating or milling disc is 7.376 inches. The thickness of the disc 56 is about 0.5 inch.

The eviscerating disc 56 is characterised by the shape of its teeth 70. All the teeth 70 of the disc 56 are made the same. One tooth 70 is illustrated in FIG. 14. The cut clearance angle "C" of that tooth is zero degree. The length of the raker portion "A" of the tooth is ⅓ of the pitch "B" between teeth. The height "H" of the cutting portion of the tooth is substantially the same as the length of the raker portion "A", and substantially the same as the thickness of the disc 56. The hook angle "D" of the face of the tooth in also zero degree. Each tooth 70 has three cutting edges; these are two radial cutting edges 100, 102 along the height "H" of the tooth, one on each side of the disc, and one axial cutting edge 103 along the tip of the tooth extending along the thickness of the tooth.

Referring now to FIG. 15, the operation of the eviscerating disc 56 will be explained. Because of the long and high raker portion "A" on every tooth 70, the cutting edge 103 along the tip of the tooth 70 can only cut flesh extending above the circumference 92 of the disc 56. The available material to be cut by a tooth is represented by the accumulation of flesh at label 94. The available material to be cut for the following tooth 70' is represented by the accumulation of flesh at label 96. As can be appreciated, the material to be cut is the compressible material that can recover following the passage of a tooth. The material to be cut is the material in which any given tooth 70 can sink into. The closer the tooth 70 gets from a solid surface such as a bone or dense cartilage, the disc can no longer sink into the flesh and therefor the disc 56 can no longer penetrate and cut the flesh. Although the operation of the cutting edge 103 along the tip of the tooth has been described, the operation of the radial cutting edges 100, 102 is a same manner.

It will be appreciated that doing a clean cut in meat or similar flesh material, requires that this flesh material be solidly held against the cutting edge. In the present crab processing machine 40, the crab body 32 is held by the legs 24 of the crab 30. Therefore, this eviscerating disc 56 is limited in the penetration of the crab body 32 by the elasticity of the work piece.

The cutting edges of each tooth 70 cannot cut all that comes across their path. Some material is cut, and some material is pulled away from the crab body 32. Consequently, the cleaning of the visceral cavities of the crab body by the disc 56 reaches much larger that the groove 72 made by the disc 56. Any stringy material attached to the organs along the path of the milling disc 56 is also taken out by the milling disc 56.

In the woodworking industry, a small or zero degree hook angle "D" is known to produce a smooth and high quality cut, with no over-feed and no kickback. On the other hand, a saw tooth with a zero degree cut clearance "C" would be useless for sawing wood or similar dense material, because a saw tooth with no cut clearance would not cut into material such as wood. Analogically, every tooth 70 of the eviscerating disc 56 has its own "raker" or "depth gauge" that is set at the same diameter than the cutting edge 103 on the tip of the tooth.

Although the milling disc 56 has little or no use in the woodworking industry, the teeth of the disc 56 are ideal for eviscerating a crab body 32. In a crab processing application, the disc 56 has the advantage of cutting through compressible flesh, but stop short of cutting any solid object, such as a bones or dense cartilage. The shape the teeth 70 of the disc 56 makes it ideal for milling a groove along a crab body, to remove organs and inedible material by cutting and pulling, and stop the cut near the bone plate 26 and bony ridge 28 where there is no more inedible material to remove. The line of cut 74 as explained before has a first advantage of not cutting through the crab body, and also of preserving valuable meat along the back of the crab body 32.

While one embodiment of the present invention has been illustrated in the accompanying drawings and described herein above, it will be appreciated by those skilled in the art that various modifications, alternate constructions and equivalents may be employed. Therefore, the above description and illustrations should not be construed as limiting the scope of the invention, which is defined in the appended claims.

What is claimed is:

1. A crab processing machine for eviscerating and cleaning crabs, comprising in series; an infeed conveyor, a carapace removing and body grooving station, a high pressure water cleaning station and a body separating station; and wherein said carapace removing and body grooving station comprises an eviscerating disc being configured for milling a groove along the underside of a crab body, said disc comprising:
    a circular shape;
    a plurality of teeth extending along a circumference thereof;
        each of said teeth being formed by two radial cutting edges extending radially relative to said circular shape; said two cutting edges being joined by a third cutting edge extending transversely between said two radial cutting edges and defining a tip of said tooth;
    each of said teeth having a cut clearance angle of zero degree, and a hook angle of zero degree.

2. The crab processing machine as claimed in claim 1, wherein each of said teeth having a raker portion adjoining said tip.

3. The crab processing machine as claimed in claim 2, wherein said raker portion extends circumferentially one third of a distance between teeth.

4. The crab processing machine as claimed in claim 3, wherein each of said teeth has a height that is a same dimension as a length of said raker portion.

5. The crab processing machine as claimed in claim 4, further having a thickness, and wherein said thickness is a same dimension as said height.

6. The crab processing machine as claimed in claim 1, wherein each of said cutting edges is a straight cutting edge.

7. The crab processing machine as claimed in claim 1, wherein said infeed conveyor comprises a pair of lower belts and a pair of upper the belts cooperating with said pair of lower belts for retaining crab legs between said upper belts and said lower belts.

8. The crab processing machine as claimed in claim 7, wherein all said conveyor belts having a rough surface for securely retaining said crab legs there between.

9. The crab processing machine as claimed in claim 1, wherein said eviscerating disc is configured for cutting a square groove along a longitudinal axis along the underside of a crab body, and said first high water pressure station comprises high water pressure nozzles being oriented toward said square groove.

\* \* \* \* \*